United States Patent [19]
Gouldie et al.

[11] Patent Number: 5,735,071
[45] Date of Patent: Apr. 7, 1998

[54] FISHING ACCESSORY

[76] Inventors: David J. Gouldie; Deborah Gouldie, both of 124 Crabapple La., Franklin Park, N.J. 08823-1409

[21] Appl. No.: 635,561

[22] Filed: Apr. 22, 1996

[51] Int. Cl.⁶ ............................................ A01K 97/00
[52] U.S. Cl. ........................................... 43/4; 7/106
[58] Field of Search ........................ 43/4; 7/106, 158; 30/124, 125, 126, 127, 366

[56] References Cited

U.S. PATENT DOCUMENTS

| | | | |
|---|---|---|---|
| 391,500 | 10/1888 | Wood | 30/127 |
| 682,892 | 9/1901 | Thurston | 30/125 |
| 2,948,979 | 8/1960 | Kulp | 43/4 |
| 3,050,896 | 8/1962 | Parker | 43/4 |
| 3,307,551 | 3/1967 | Violet | 30/125 |
| 3,419,924 | 1/1969 | Archibald | 7/106 |
| 3,718,938 | 3/1973 | Blume | 7/106 |
| 3,925,919 | 12/1975 | Huth | 43/4 |
| 4,073,083 | 2/1978 | Davis | 43/4 |
| 4,118,881 | 10/1978 | McFarlane | 43/4 |
| 4,660,314 | 4/1987 | Janssen | 43/4 |
| 4,674,220 | 6/1987 | Bearce | 43/4 |
| 4,706,403 | 11/1987 | Reynolds | 43/4 |
| 4,765,082 | 8/1988 | Nicholas | 43/4 |
| 4,796,372 | 1/1989 | Klein | 43/4 |
| 4,848,019 | 7/1989 | Toogood | 43/4 |
| 4,915,631 | 4/1990 | Robinson | 43/4 |
| 5,125,180 | 6/1992 | Dean | 43/4 |
| 5,155,930 | 10/1992 | Monarez | 43/4 |
| 5,367,814 | 11/1994 | Petersen | 43/4 |

FOREIGN PATENT DOCUMENTS 559610   9/1923   France ............................. 7/106

*Primary Examiner*—Kurt Rowan
*Attorney, Agent, or Firm*—Michael I. Kroll

[57] ABSTRACT

A fishing accessory (20) which comprises a tool assembly (22) having a fishhook baiter (24) on one end and a fishing line cutter (26) on an opposite end. A pen shaped main body (28) is provided. A structure (30) in the pen shaped main body (28) is for receiving the fishhook baiter (24) of the tool assembly (22), so that the fishing line cutter (26) can be in position for use. A facility (32) on the pen shaped main body (28) is for accepting the fishing line cutter (26) of the tool assembly (22), so that the fishhook baiter (24) can be in position for use.

17 Claims, 4 Drawing Sheets

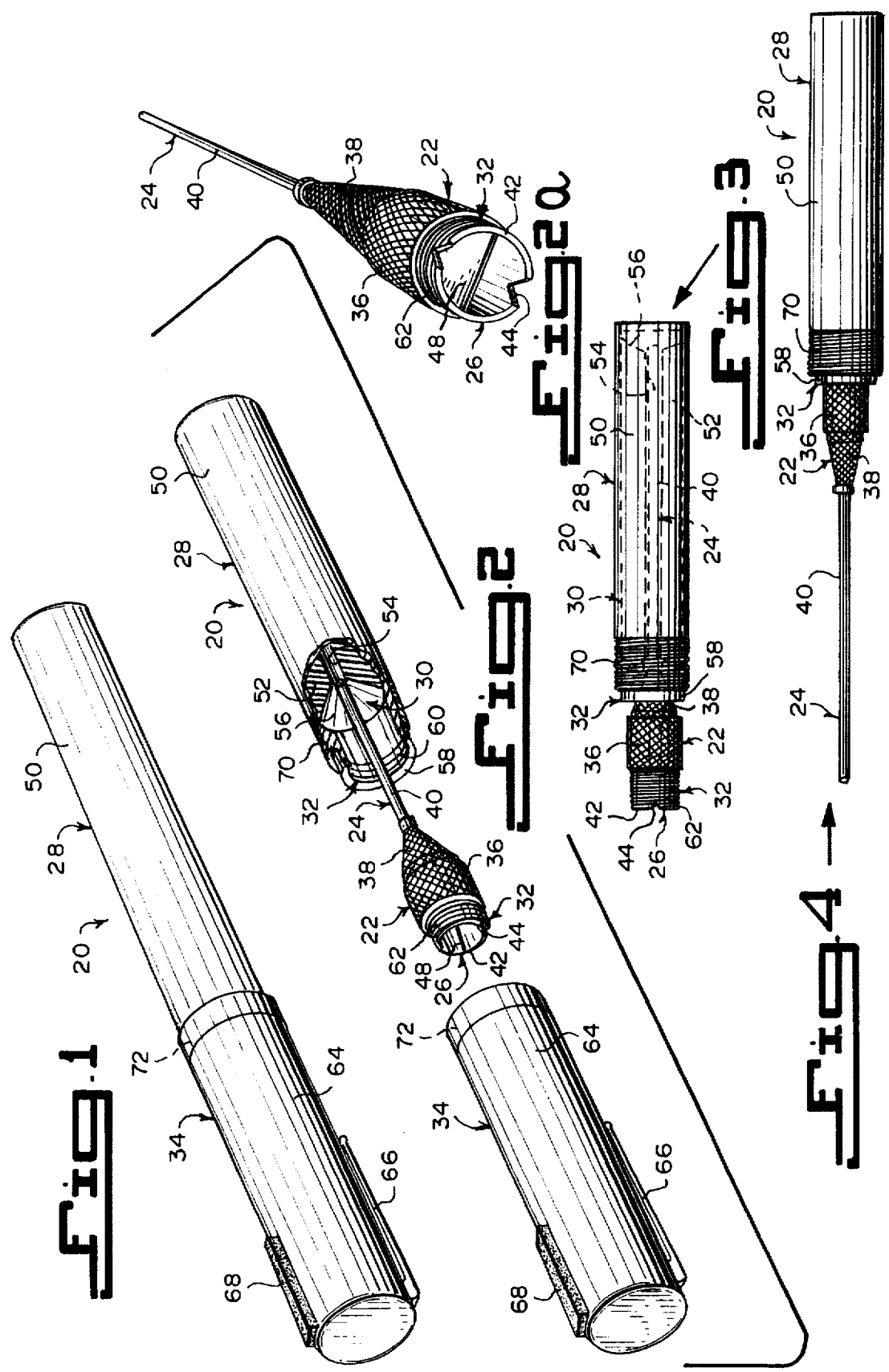

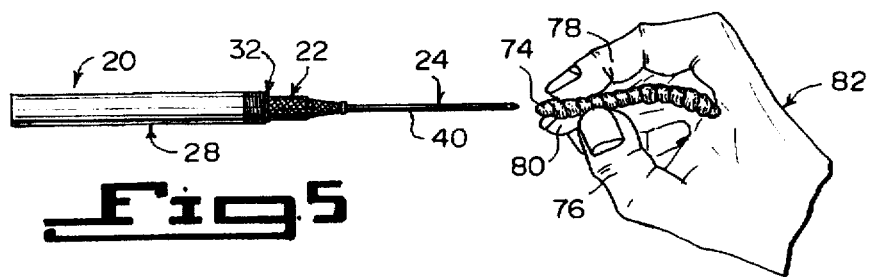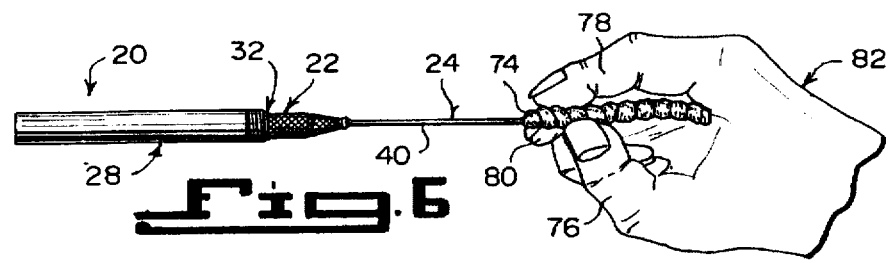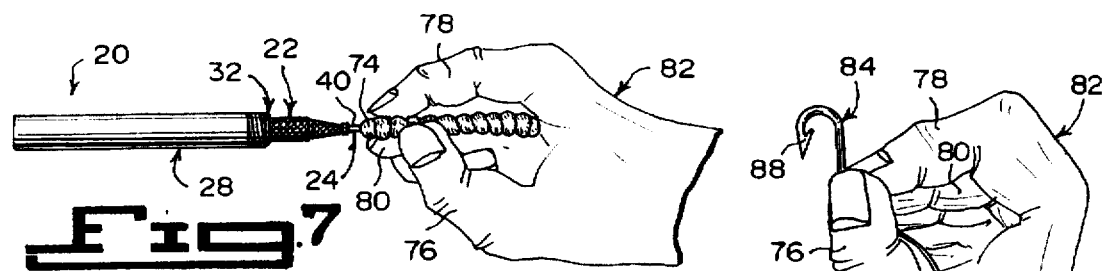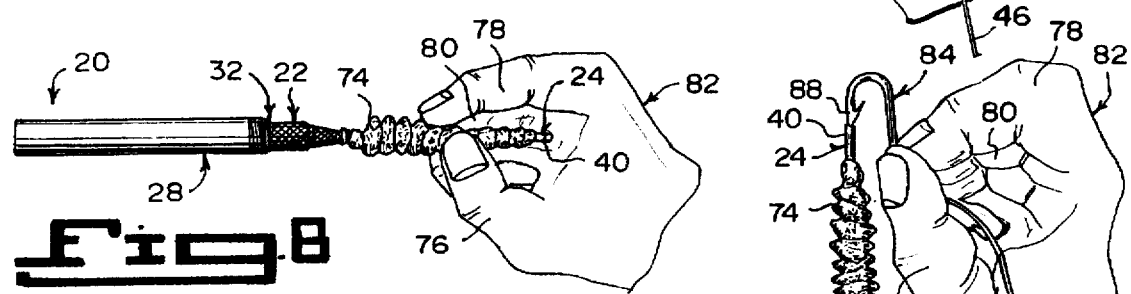

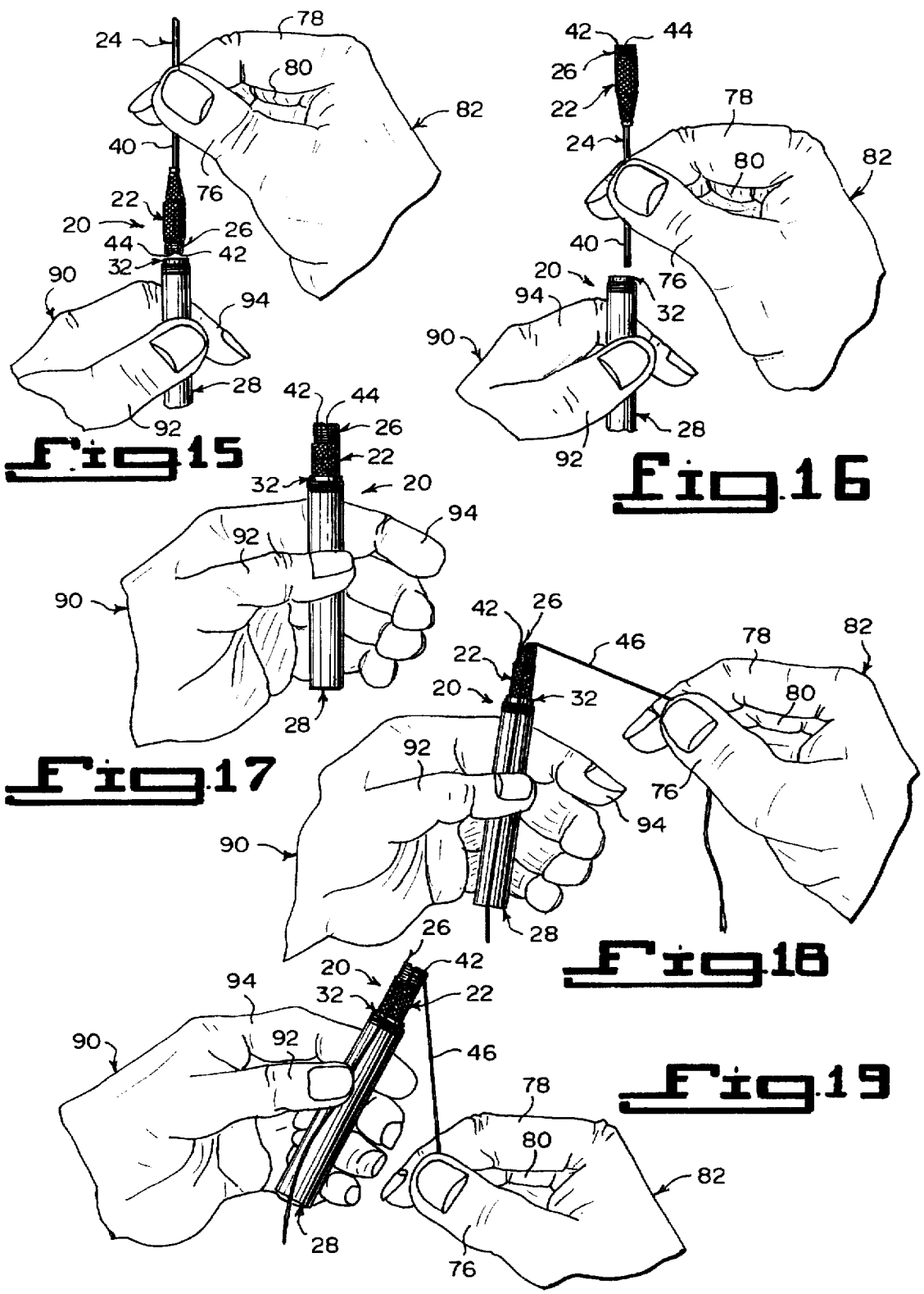

FISHING ACCESSORY

BACKGROUND OF THE INVENTION

1. Field of the Invention

The instant invention relates generally to fishhook baiting devices and more specifically it relates to a fishing accessory.

2. Description of the Prior Art

Numerous fishhook baiting devices have been provided in prior art. For example, U.S. Pat. Nos. 2,482,721 to Sigmundi; 2,584,231 to Schmidt; 3,293,790 to Konomos and French patent number 2354704 to Nicholson et al. all are illustrative of such prior art. While these units may be suitable for the particular purpose to which they address, they would not be as suitable for the purposes of the present invention as heretofore described.

SIGMUNDI, ARTHUR ROY

BAIT RETAINER FOR FISHHOOKS

U.S. Pat. No. 2,482,721

A fishhook having a hook member, a shank integral at one end therewith and a line-attaching eye at the other end of the shank, in combination with a bait-holding coil surrounding the shank adjacent the hook member. The coil has a shank which is integral with the eye and extends along the hook shank, is closely adjacent thereto and holds the coil spaced from the hook shank and adjacent the hook member.

SCHMIDT, FRANK G.

FISHHOOK BAITER

U.S. Pat. No. 2,584,321

A baiter for baiting fish hooks having a gut lead formed with a loop, comprising a rectilinar skewer having a skewer hook at one end thereof. The transverse dimension of the entire skewer hook is of a size less than the largest transverse dimension of the skewer. A baiting sleeve open at opposite ends on which bait is held, is adapted to be slid over the skewer past the skewer hook. The hook is adapted to be extended through the loop of a gut fish hook lead, connecting the fish hook to the skewer. The sleeve and bait are movable over the gut lead and skewer hook carrying the bait to the fish hook. The sleeve is removable from the bait and the skewer hook depositing the bait on the fish hook.

KONOMOS, DEAN A.

FISHING LURE

U.S. Pat. No. 3,293,790

In a fishing lure, a bait holder comprising a straight rigid rod-like bait impaling member is tapered at one end thereof to provide a bait penetrating means thereon at the end of the impaling member. The rod-like member has an externally threaded portion adjacent the tapered end thereof. Means on the other end of the rod-like member for attaching a line thereto extends endwise beyond the rod-like member. An internally threaded member engages with the threaded portion of the rod-like member and extends endwise therefrom. A hook means is mounted on the internally threaded member. A spring bait gripping member is mounted on the rod-like member adjacent the other end thereof and extends toward the hook means from the other end of the rod-like member. The gripping member has portions directed toward each other and is provided with tapered ends in position to penetrate the bait mounted on the rod-like member.

NICHOLSON, ROBERT WILLIAM

ALLEN, ANTHONY LEONARD

FISHING BAIT FIXING DEVICE

French Patent Number 2354704

A device for fixing bait near a fish hook comprises a rod extending through the bait and a fixing sleeve slid onto the line. The lower end of the rod is connected by a loop to the hook, or may be made integral with the hook. The sleeve is resilient and is pushed onto the rod. The rod may be formed as an elongation of the hook shank and the line is attached to an eyelet formed in the hook. The rod may be provided with a stop near the hook to prevent movement of the bait.

SUMMARY OF THE INVENTION

A first object of the present invention is to provide a fishing accessory that will overcome the shortcomings of the prior art devices.

A second object is to provide a fishing accessory having a tool assembly that will transfer any type of bait directly onto a fishhook more quickly and securely than can be done by hand.

A third object is to provide a fishing accessory in which the tool assembly can also be used to cut a fishing line neatly with less fumbling around.

A fourth object is to provide a fishing accessory in which the tool assembly is safely carried and stored within a pen shaped main body having a protective cap with a pocket clip, so that it can be attached to a garment.

A fifth object is to provide a fishing accessory in which a sharpening stone mounted on the protective cap can sharpen adult fishhook barb therefrom.

A sixth object is to provide a fishing accessory that is simple and easy to use.

A seventh object is to provide a fishing accessory that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of the instant invention in a closed stored position.

FIG. 2 is a partly exploded perspective view of the instant invention, with the pen shaped main body and the baiting tube straightener insert broken away and in section.

FIG. 2a shows the tool assembly.

FIG. 3 is a side view showing the tool assembly placed in the pen shaped main body as a fishing line cutter.

FIG. 4 is a side view showing the tool assembly placed in the pen shaped main body as a fishhook baiter.

FIGS. 5 through 14 are elevational views showing various steps in baiting a fishhook with the instant invention.

FIGS. 15 through 19 are elevational views showing various steps in cutting a fishing line with the instant invention.

Similar reference characters denote corresponding features consistently throughout the attached drawings.

DETAILED DESCRIPTION OF THE PREFERRED EMBODIMENTS

Figure 11:
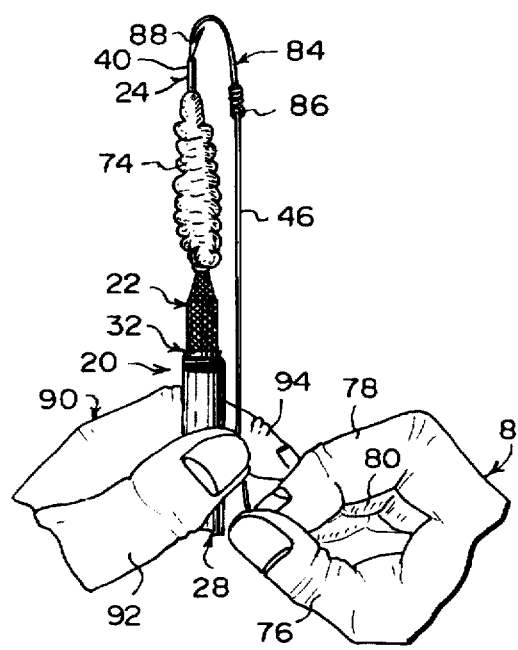
Figure 12:
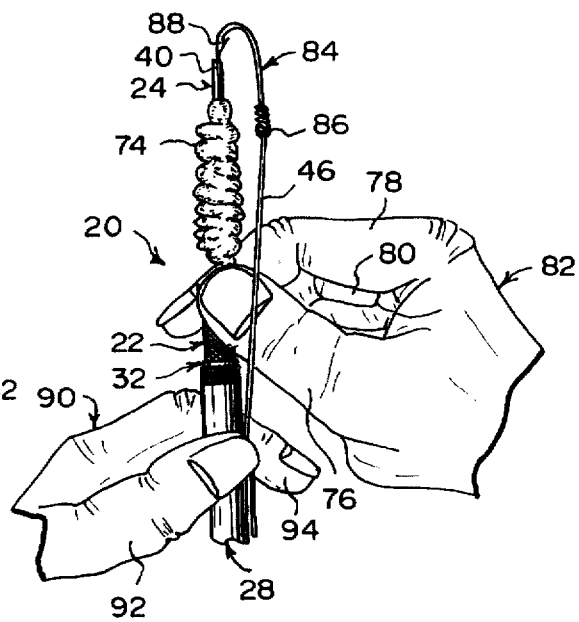
Figure 13:
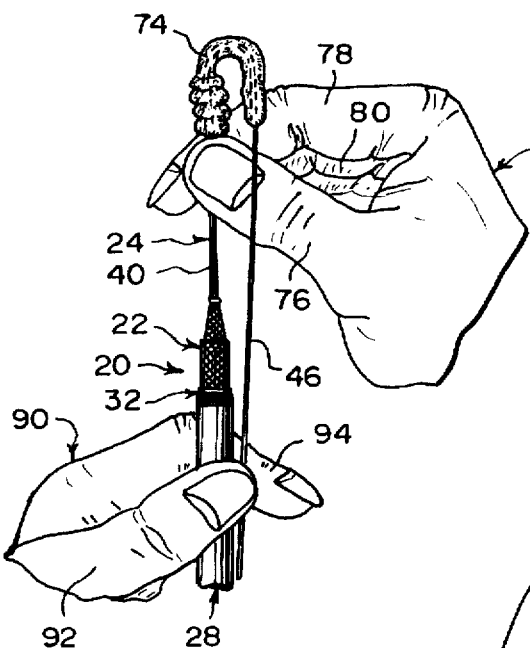
Figure 14:
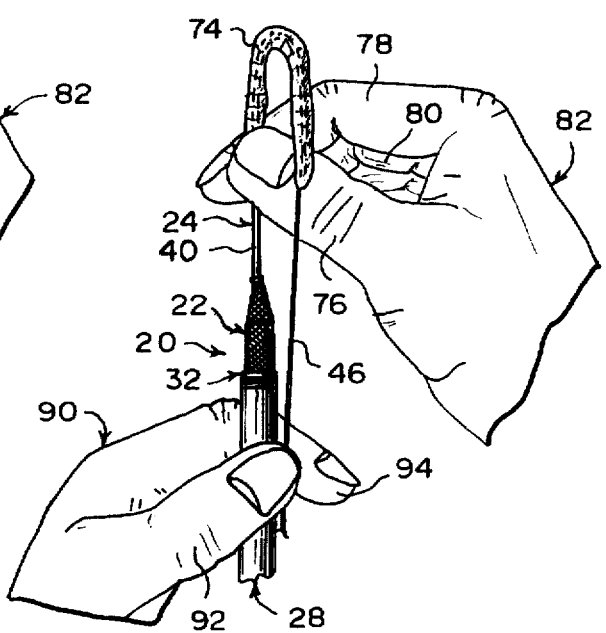

Turning now descriptively to the drawings, in which similar reference characters denote similar elements throughout the several views, FIGS. 1 through 19 illustrate a fishing accessory 20 which comprises a tool assembly 22 having a fishhook baiter 24 on one end and a fishing line cutter 26 on an opposite end. A pen shaped main body 28 is provided. A structure 30 in the pen shaped main body 28 is for receiving the fishhook baiter 24 of the tool assembly 22, so that the fishing line cutter 26 can be in position for use. A facility 32 on the pen shaped main body 28 is for accepting the fishing line cutter 26 of the tool assembly 22, so that the fishhook baiter 24 can be in position for use. A protective cap 34, as shown in FIGS. 1 and 2 is to engage with the pen shaped main body 28, when the fishing line cutter 26 of the tool assembly 22 is in position for use, so that the tool assembly 22 can be safely carried and stored therein.

The tool assembly 22, as best seen in FIGS. 2, 2a, 3 and 4 includes a knurled cylindrical head 36 with a tapered end 38. An elongated tube 40 extends from the tapered end 38 to function as the fishhook baiter 24. A collar 42 is on the cylindrical head 36 opposite from the tapered end 38. The collar 42 has a pair of aligned V-notches 44 to receive a fishing line 46 to be cut. A recessed cutting blade 48 is within the collar 42 to cut the fishing line 46, thereby functioning as the fishing line cutter 26.

The pen shaped main body 28 is a cylindrical housing 50 having open ends. The fishhook baiter receiving structure 30, as shown in FIGS. 2 and 3, consists of a cylindrical member 52 having a longitudinal central bore 54 with inwardly tapered ends 56. The cylindrical member 52 is inserted into the pen shaped main body 28. A collar 58 is on one end of the pen shaped main body 28. The elongated tube 40 on the tapered end 38 of the tool assembly 22 can be placed through the longitudinal central bore 54 with the tapered end 38 up against the collar 58 on the pen shaped main body 28.

The fishing line cutter accepting facility 32 comprises the collar 58 on one end of the pen shaped main body 28 having internal threads 60. The collar 42 on the tool assembly 20 has external threads 62. The external threads 62 can thread into the internal threads 60, to maintain the collar 42 of the tool assembly 20 in the pen shaped main body 28.

The protective cap 34 is a cylindrical casing 64 having an open end to fit over one end of the pen shaped main body 28. The protective cap 34 includes a pocket clip 66 connected thereto, so that it can be attached to a garment. The protective cap 34 also includes a fishhook sharpening stone 68 connected thereto, so that a dull fishhook barb can be sharpened.

The pen shaped main body 28 has external threads 70 at one end. The protective cap 34 has internal threads 72 at the open end. The internal threads 72 can thread onto the external threads 70, to maintain the protective cap 34 on the pen shaped main body 28.

OPERATION OF THE INVENTION

To use the fishing accessory 20 as the fishhook baiter 24, the following steps should be taken:

1. Screw the collar 42 with external threads 62 of the tool assembly 22 into the collar 58 with internal threads 60 on a pen shaped main body 28, so that the elongated tube 40 of the tool assembly 22 will extend therefrom (see FIG. 4).
2. Grasp bait 74 firmly between a thumb 76, index finger 78 and middle finger 80 of a first hand 82 (see FIG. 5).
3. Insert an end of the bait 74 with the first hand 82 onto a tip of the elongated tube 40 (see FIG. 6).
4. Push the bait 74 with the first hand 82 all the way down to the end of the elongated tube 40 (see FIG. 7).
5. Make sure the bait 74 is completely installed by the first hand 82 onto the elongated tube 40 with the tip exposed (see FIG. 8).
6. Holding a fishhook 84 by its eyelet 86, so that a barb 88 will face away from the first hand 82 (see FIG. 9).
7. Place a point of the barb 88 on the fishhook 84 into a hollow end at the tip of the elongated tube 40 by the first hand 82, while a second hand 90 holds the pen shaped main body 28 (see FIG. 10).
8. Slide the thumb and index finger 78 of the first hand 82 down the fishing line 46 connected to the eyelet 86 of the fishhook 84 past the second hand 90, with just enough downward pressure on the fishing line 46, to keep the point of the barb 88 on the fishhook 84 in the hollow end at the tip of the elongated tube 40, so that a thumb 92 and index finger 94 of the second hand 90 which holds the pen shaped main body 28 can grasp the fishing line 46 (see FIG. 11).
9. Position the thumb 76 and index finger 78 of the first hand 82 at the bottom of the bait 74, to slide the bait 74 up the elongated tube 40 (see FIG. 12).
10. Push the bait 74 up and onto the fishhook 84 (see FIG. 13).
11. Secure the bait 74, so that it will be maintained in a stationary manner over the fishhook 84, eyelet 86 and fishing line 46 adjacent thereto (see FIG. 14).

To use the fishing accessory 20 as the fishing line cutter 26, the following steps should be taken:

1. Unscrew the collar 42 with external threads 62 of a tool assembly 22 from the pen shaped main body 28 (see FIG. 15).
2. Invert the elongated tube 40 of the tool assembly 22, so as to insert the elongated tube 40 into the central bore 54 of the cylindrical member 52 within the pen shaped main body 28 (see FIG. 16).
3. Grasp the pen shaped main body 28 in the second hand 90 with one V-notch 44 on the collar 42 of the tool assembly 22 facing towards the thumb 92 on the second hand 90 (see FIG. 17).
4. Hold the fishing line 46 in a firm manner against the pen shaped main body 28 with the thumb 92 of the second hand (see FIG. 18).
5. Guide the fishing line 46 into the two aligned V-notches 44 on the collar 42 of the tool assembly 22 and gently pull down on the fishing line 46 with the first hand 82, so that the fishing line 46 will lay across the cutting blade 48 recessed within the collar 42 (see FIG. 18).
6. Pull the fishing line 46 straight down with very little effort by the first hand 82, so that the cutting blade 48 will cut the fishing line 46 (see FIG. 19).

LIST OF REFERENCE NUMBERS

| | |
|---|---|
| 20 | fishing accessory |
| 22 | tool assembly of 20 |
| 24 | fishhook baiter of 22 |
| 26 | fishing line cutter of 22 |
| 28 | pen shaped main body of 20 |
| 30 | fishhook baiter receiving structure of 20 |
| 32 | fish line cutter accepting facility of 20 |
| 34 | protective cap of 20 |
| 36 | knurled cylindrical head of 22 |
| 38 | tapered end of 36 |
| 40 | elongated tube of 22 |
| 42 | collar of 22 |
| 44 | V-notch on 42 |
| 46 | fishing line |
| 48 | recessed cutting blade in 42 |
| 50 | cylindrical housing for 28 |
| 52 | cylindrical member for 30 |
| 54 | longitudinal central bore in 52 |
| 56 | inwardly tapered end of 52 |
| 58 | collar of 28 |
| 60 | internal threads in 58 |
| 62 | external threads on 42 |
| 64 | cylindrical casing for 34 |
| 66 | pocket clip on 34 |
| 68 | fishhook sharpening stone on 34 |
| 70 | external threads on 28 |
| 72 | internal threads in 34 |
| 74 | bait |
| 76 | thumb of 82 |
| 78 | index finger of 82 |
| 80 | middle finger of 82 |
| 82 | first hand |
| 84 | fishhook |
| 86 | eyelet of 84 |
| 88 | barb of 84 |
| 90 | second hand |
| 92 | thumb of 90 |
| 94 | index finger of 90 |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fishing accessory which comprises:
   a) a tool assembly having a fishhook baiter on one end and a fishing line cutter on an opposite end;
   b) a pen shaped main body;
   c) means in said pen shaped main body for receiving said fishhook baiter of said tool assembly, so that said fishing line cutter can be in position for use;
   d) means on said pen shaped main body for accepting said fishing line cutter of said tool assembly, so that said fishhook baiter can be in position for use;
   e) a protective cap to engage with said pen shaped main body, when said fishing line cutter of said tool assembly is in position for use, so that said tool assembly can be safely carried and stored therein; and
   f) a fishhook sharpening stone connected to said protective cap, so that a dull fishhook barb can be sharpened.

2. A fishing accessory as recited in claim 1, wherein said tool assembly includes:
   a) a knurled cylindrical head with a tapered end;
   b) an elongated tube extending from said tapered end to function as said fishhook baiter;
   c) a collar on said cylindrical head opposite from said tapered end, said collar having a pair of aligned V-notches to receive a fishing line to be cut; and
   d) a recessed cutting blade within said collar to cut the fishing line, thereby functioning as said fishing line cutter.

3. A fishing accessory as recited in claim 1, wherein said pen shaped main body is a cylindrical housing having open ends.

4. A fishing accessory as recited in claim 1, wherein said protective cap is a cylindrical casing having an open end to fit over one end of said pen shaped main body.

5. A fishing accessory as recited in claim 1, wherein said protective cap includes a pocket clip connected thereto, so that it can be attached to a garment.

6. A fishing accessory as recited in claim 1, further including:
   a) said pen shaped main body having external threads at one end; and
   b) said protective cap having internal threads at an open end, so that said internal threads can thread onto said external threads to maintain said protective cap on said pen shaped main body.

7. A fishing accessory which comprises:
   a) a tool assembly having a fishhook baiter on one end and a fishing line cutter on an opposite end;
   b) a pen shaped main body;
   c) means in said pen shaped main body for receiving said fishhook baiter of said tool assembly, so that said fishing line cutter can be in position for use, wherein said fishhook baiter receiving means includes:
      i) a cylindrical member having a longitudinal central bore with inwardly tapered ends, said cylindrical member insertable into said pen shaped main body; and
      ii) a collar on one end of said pen shaped main body, so that an elongated tube on a tapered end of said tool assembly can be placed through said longitudinal central bore with said tapered end up against said collar on said pen shaped main body; and
   d) means on said pen shaped main body for accepting said fishing line cutter of said tool assembly, so that said fishhook baiter can be in position for use.

8. A fishing accessory which comprises:
   a) a pen shaped main body;
   b) a tool assembly having a fishhook baiter on one end and a fishing line cutter on an opposite end;
   c) means in said pen shaped main body for receiving said fishhook baiter of said tool assembly, so that said fishing line cutter can be in position for use; and
   d) means on said pen shaped main body for accepting said fishing line cutter of said tool assembly, so that said fishhook baiter can be in position for use, wherein said fishing line cutter accepting means includes:

i) a collar on one end of said pen shaped main body having internal threads; and ii) a collar on said tool assembly having external threads, whereby said external threads can thread into said internal threads, to maintain said collar of said tool assembly in said pen shaped main body.

9. A method of cutting a fishing line, which comprises the steps of:

a) unscrewing a collar with external threads of a tool assembly from a pen shaped main body;

b) inverting an elongated tube of the tool assembly, so as to insert the elongated tube into a central bore of a cylindrical member within the pen shaped main body;

c) grasping the pen shaped main body in a second hand with one V-notch on the collar of the tool assembly facing towards a thumb on the second hand;

d) holding a fishing line in a firm manner against the pen shaped main body with the thumb of the second hand;

e) guiding the fishing line into two aligned V-notches on the collar of the tool assembly and gently pull down on the fishing line with the first hand, so that the fishing line will lay across a cutting blade recessed within the collar; and f) pulling the fishing line straight down with very little effort by the first hand, so that the cutting blade will cut the fishing line.

10. A fishing accessory which comprises:

a) a tool assembly having a fishhook baiter on one end and a fishing line cutter on an opposite end, said tool assembly including:

i) a knurled cylindrical head with a tapered end;

ii) an elongated tube extending from said tapered end to function as said fishhook baiter;

iii) a collar on said cylindrical head opposite from said tapered end, said collar having a pair of aligned V-notches to receive a fishing line to be cut; and iv) a recessed cutting blade within said collar to cut the fishing line, thereby functioning as said fishing line cutter;

b) a pen shaped main body;

c) means in said pen shaped main body for receiving said fishhook baiter of said tool assembly, so that said fishing line cutter can be in position for use;

d) means on said pen shaped main body for accepting said fishing line cutter of said tool assembly, so that said fishhook baiter can be in position for use; and e) a protective cap to engage with said pen shaped main body, when said fishing line cutter of said tool assembly is in position for use, so that said tool assembly can be safely carried and stored therein.

11. A fishing accessory as recited in claim 10, wherein said pen shaped main body is a cylindrical housing having open ends.

12. A fishing accessory as recited in claim 11, wherein said fishhook baiter receiving means includes:

a) a cylindrical member having a longitudinal central bore with inwardly tapered ends, said cylindrical member is inserted into said pen shaped main body; and b) a collar on one end of said pen shaped main body, so that an elongated tube on a tapered end of said tool assembly can be placed through said longitudinal central bore with said tapered end up against said collar on said pen shaped main body.

13. A fishing accessory as recited in claim 12, wherein said fishing line cutter accepting means includes:

a) a collar on one end of said pen shaped main body having internal threads; and b) a collar on said tool assembly having external threads, whereby said external threads can thread into said internal threads, to maintain said collar of said tool assembly in said pen shaped main body.

14. A fishing accessory as recited in claim 13, wherein said protective cap is a cylindrical casing having an open end to fit over one end of said pen shaped main body.

15. A fishing accessory as recited in claim 14, wherein said protective cap includes a pocket clip connected thereto, so that it can be attached to a garment.

16. A fishing accessory as recited in claim 15, wherein said protective cap includes a fishhook sharpening stone connected thereto, so that a dull fishhook barb can be sharpened.

17. A fishing accessory as recited in claim 16, further including:

a) said pen shaped main body having external threads at one end; and b) said protective cap having internal threads at an open end, so that said internal threads can thread onto said external threads to maintain said protective cap on said pen shaped main body.

* * * * *